(12) United States Patent
Nakagawa

(10) Patent No.: US 9,172,827 B2
(45) Date of Patent: Oct. 27, 2015

(54) COMMUNICATION APPARATUS, CONTROL METHOD THEREOF AND STORAGE MEDIUM

(71) Applicant: CANON KABUSHIKI KAISHA, Tokyo (JP)

(72) Inventor: Kaori Nakagawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/455,006

(22) Filed: Aug. 8, 2014

(65) Prior Publication Data

US 2015/0055192 A1   Feb. 26, 2015

(30) Foreign Application Priority Data

Aug. 21, 2013   (JP) ................. 2013-171704

(51) Int. Cl.
*H04N 1/40* (2006.01)
*H04N 1/00* (2006.01)
*G10L 19/00* (2013.01)
*G10L 13/04* (2013.01)

(52) U.S. Cl.
CPC .......... *H04N 1/00122* (2013.01); *G10L 13/043* (2013.01); *G10L 19/0019* (2013.01); *H04N 1/001* (2013.01)

(58) Field of Classification Search
CPC ............... H04N 1/00122; H04N 1/001; G10L 19/0019; G10L 13/043

USPC .................................................. 358/469, 400
See application file for complete search history.

(56) References Cited

U.S. PATENT DOCUMENTS

| | | | |
|---|---|---|---|
| 5,428,673 A | 6/1995 | Nakagawa et al. | 379/100 |
| 5,896,204 A | 4/1999 | Sato et al. | 358/405 |
| 6,377,357 B1 | 4/2002 | Sato et al. | 358/1.15 |
| 6,437,870 B1 | 8/2002 | Yoshida et al. | 358/1.15 |
| 2004/0131062 A1* | 7/2004 | Horie | 370/395.1 |
| 2006/0165125 A1* | 7/2006 | Fushimi et al. | 370/474 |

FOREIGN PATENT DOCUMENTS

JP    2008-228219 A    9/2008

* cited by examiner

*Primary Examiner* — Douglas Tran
(74) *Attorney, Agent, or Firm* — Fitzpatrick, Cella, Harper & Scinto

(57) ABSTRACT

There is provided a technique of, in a communication apparatus capable of executing facsimile communication by a deemed voice scheme, enabling generation of a communication error to be prevented regardless of a voice encoding scheme used to encode a facsimile signal. To achieve this, a communication apparatus (first FAX apparatus) establishes a voice signal transmission session with the second FAX apparatus serving as a partner apparatus in FAX communication for FAX communication by the deemed voice scheme. The first FAX apparatus determines a voice encoding scheme which is used in the established session to encode a FAX signal into a voice signal. In accordance with the determination result, the first FAX apparatus limits modulation schemes usable in generation of the FAX signal when performing FAX communication by the deemed voice scheme.

11 Claims, 4 Drawing Sheets

COMMUNICATION APPARATUS, CONTROL METHOD THEREOF AND STORAGE MEDIUM

BACKGROUND OF THE INVENTION

1. Field of the Invention

The present invention relates to a communication apparatus which performs facsimile communication on an IP network by using a VoIP (Voice over IP) technique, a control method thereof, and a storage medium.

2. Description of the Related Art

Recently, a technique for performing facsimile (FAX) communication on an IP network is being standardized. An example of such a standardized scheme is the T.38 scheme in which a G3 FAX (T.30) signal is converted into an IP packet by using a protocol called IFP (Internet Facsimile Protocol), and the IP packet is transmitted in real time on an IP network. There is also a deemed voice scheme in which a G3 FAX (T.30) signal is digitized by using the VoIP (Voice over IP) technique, and the digital signal is transmitted in real time as a voice signal on an IP network.

The VoIP technique used in FAX communication by the deemed voice scheme is a technique of sampling an analog voice signal, converting it into a digital voice signal, compressing the digital voice signal by voice encoding, further converting the compressed signal into an IP packet, and transmitting the IP packet to an IP network. Generally, the VoIP technique often adopts a lossy compression voice encoding scheme to increase the compression ratio. This is premised on that, when a loss of data occurs in a voice signal on a transmission path, the voice can be recognized by the human auditory sense as long as degradation of the voice quality is limited to a certain degree, unlike a data signal. For example, in an IP-PBX environment, voice encoding schemes such as G.729 (CELP, 8 kbps), G.726 (ADPCM, 32 kbps), and G.711 (PCM, 64 kbps) having different communication rates (transmission bandwidths) depending on the compression ratio are employed.

Japanese Patent Laid-Open No. 2008-228219 has proposed a technique in which the above-described voice encoding scheme is used in control of facsimile communication. A data communication terminal described in this reference decides a communication rate in T.38 facsimile communication based on the voice encoding scheme. More specifically, the data communication terminal performs a voice call connection to execute voice communication with a partner terminal connected via an IP network, and then performs a T.38 call connection to execute facsimile communication. At this time, the data communication terminal performs T.38 facsimile communication at a communication rate decided based on the type of voice encoding scheme (voice codec) used in voice communication.

When transmitting a G3 FAX signal by the deemed voice scheme, the G3 FAX signal is deemed as a voice signal, voice-encoded, and converted into an IP packet, as described above. In this deemed voice scheme, when a scheme other than the G.711 non-compression scheme is used as the voice encoding scheme, a communication terminal on the receiving side cannot accurately reproduce a G3 FAX signal used before voice encoding (compression). For this reason, the communication terminal on the receiving side cannot accurately reproduce a control signal and image signal for G3 FAX communication, and a communication error may be generated. For example, in a high-communication-rate modulation scheme such as V.34 out of modem modulation schemes supported by G3 FAX, a communication error may be generated depending on the compression ratio of the voice encoding scheme.

Conventionally, a communication terminal which performs FAX communication by the deemed voice scheme includes only an analog line interface for a public telephone network, and utilizes a dedicated gateway or adaptor to use the VoIP function. That is, the communication terminal itself does not have an interface corresponding to an IP network, and cannot recognize a voice encoding scheme used in VoIP. Hence, such a communication terminal cannot perform communication control in accordance with a voice encoding scheme to be used, in order to cope with degradation of the quality of a voice signal corresponding to a G3 FAX signal.

SUMMARY OF THE INVENTION

The present invention has been made to solve the above-described problems. The present invention provides a technique for preventing, in a communication apparatus capable of executing facsimile communication by a deemed voice scheme, generation of a communication error regardless of a voice encoding scheme used to encode a facsimile signal.

According to one aspect of the present invention, there is provided a communication apparatus capable of executing facsimile communication by a deemed voice scheme using a facsimile signal as a voice signal via an IP network, comprising: a session establishment unit configured to establish a voice signal transmission session with a partner apparatus in the facsimile communication; a determination unit configured to determine a voice encoding scheme which is used in the session established by the session establishment unit to encode the facsimile signal into the voice signal; and a limitation unit configured to limit, in accordance with the voice encoding scheme determined by the determination unit, modulation schemes usable in generation of the facsimile signal when performing the facsimile communication by the deemed voice scheme in the session established by the session establishment unit.

According to another aspect of the present invention, there is provided a method of controlling a communication apparatus capable of executing facsimile communication by a deemed voice scheme using a facsimile signal as a voice signal via an IP network, comprising steps of: establishing a voice signal transmission session with a partner apparatus in the facsimile communication; determining a voice encoding scheme which is used in the session established in the establishing step to encode the facsimile signal into the voice signal; and limiting, in accordance with the voice encoding scheme determined in the determining step, modulation schemes usable in generation of the facsimile signal when performing the facsimile communication by the deemed voice scheme in the session established in the establishing step.

According to still another aspect of the present invention, there is provided a computer-readable storage medium storing a computer program for causing a computer to execute steps of a method of controlling a communication apparatus capable of executing facsimile communication by a deemed voice scheme using a facsimile signal as a voice signal via an IP network, comprising steps of: establishing a voice signal transmission session with a partner apparatus in the facsimile communication; determining a voice encoding scheme which is used in the session established in the establishing step to encode the facsimile signal into the voice signal; and limiting, in accordance with the voice encoding scheme determined in the determining step, modulation schemes usable in generation of the facsimile signal when performing the facsimile communication by the deemed voice scheme in the session established in the establishing step.

The present invention can prevent, in a communication apparatus capable of executing facsimile communication by a deemed voice scheme, generation of a communication error regardless of a voice encoding scheme used to encode a facsimile signal.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Arrangement of FAX Apparatus>

Figure 1:
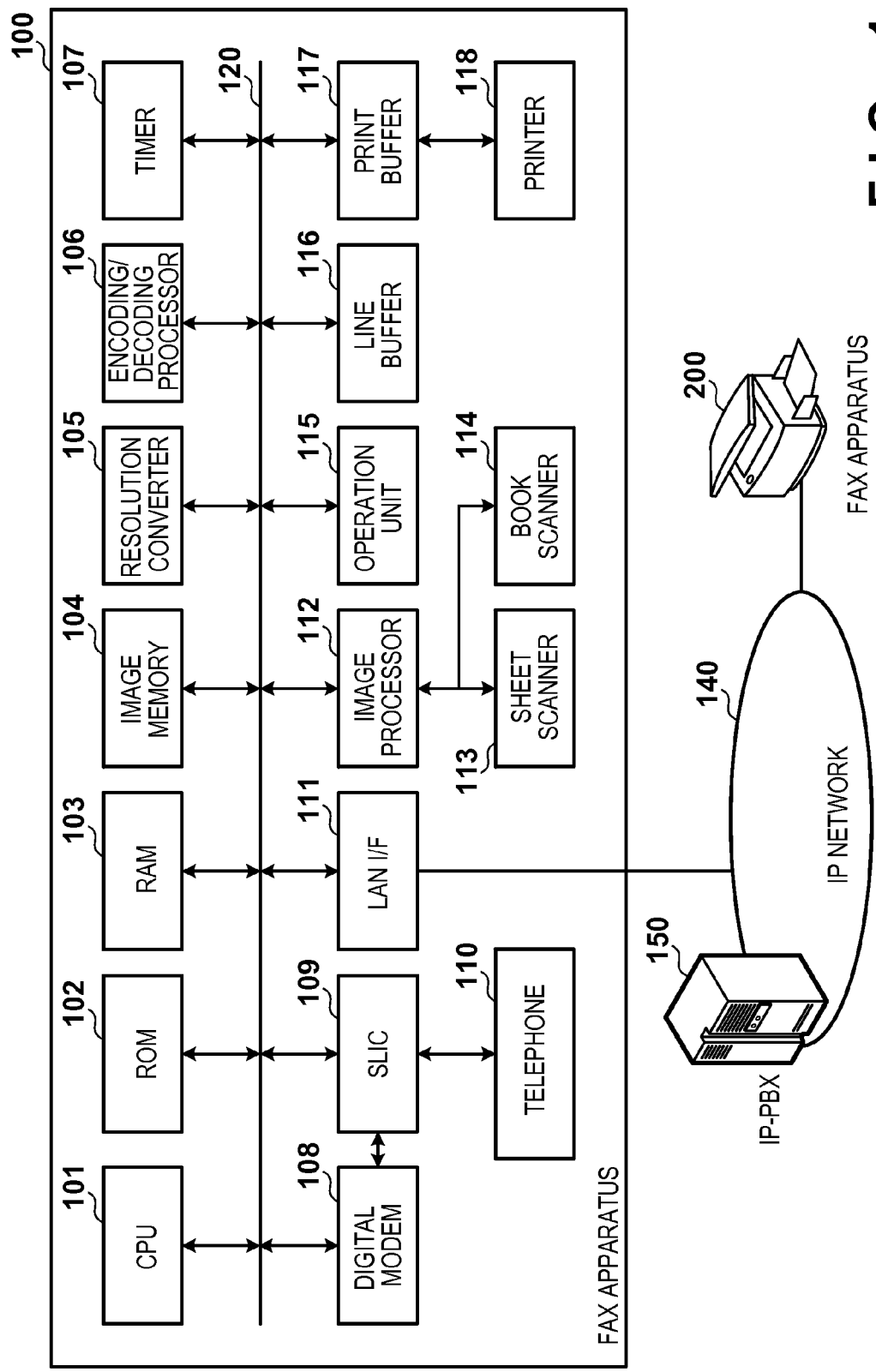
FIG. 1 is a block diagram showing the arrangement of a FAX apparatus according to embodiments of the present invention.

FIG. 1 is a block diagram showing an example of the arrangement of a facsimile (FAX) apparatus 100 according to the embodiments of the present invention. Assume that the FAX apparatus 100 and a FAX apparatus 200 have the same arrangement. The FAX apparatus 100 is connected to another FAX apparatus such as the FAX apparatus 200 via an IP network 140. The IP network 140 is a network in which IP-based communication is performed, such as a private IP network or NGN (Next Generation Network). An IP exchange (IP-PBX) 150 is connected to the IP network 140. The IP-PBX 150 performs line switching between the FAX apparatuses 100 and 200 connected to the IP network 140. Note that the FAX apparatuses 100 and 200 are examples of communication apparatuses capable of executing facsimile communication by a deemed voice scheme of transmitting a facsimile signal (FAX signal) as a voice signal via an IP network.

The FAX apparatus 100 includes a CPU 101, ROM 102, RAM 103, image memory 104, resolution converter 105, encoding/decoding processor 106, timer 107, digital modem 108, SLIC (Subscriber Line Interface Circuit) 109, telephone 110, LAN interface (I/F) 111, image processor 112, operation unit 115, line buffer 116, and print buffer 117. These devices are connected to each other via a system bus 120. The FAX apparatus 100 further includes the telephone 110 connected to the SLIC 109, a sheet scanner 113 and book scanner 114 connected to the image processor 112, and a printer 118 connected to the print buffer 117.

The CPU 101 is a system control unit, and controls the overall FAX apparatus 100. The ROM 102 stores the control program of the CPU 101. The RAM 103 is implemented by an SRAM or the like, and stores data which need to be backed up, such as setting information of the FAX apparatus 100 and management information of image data. The image memory 104 is implemented by a DRAM or the like, and stores image data to be processed by the FAX apparatus 100.

The resolution converter 105 performs resolution conversion processing such as milli-inch resolution conversion of raster data. The encoding/decoding processor 106 for reading and recording performs encoding processing and decoding processing of image data to be processed by the FAX apparatus 100. The timer 107 is implemented by an IC or the like, and is used by an application which measures the time.

The digital modem 108 transmits, to the IP network 140 via the LAN I/F 111, a digital signal generated by modulation using control data and image data transmitted from the FAX apparatus 100, and voice encoding such as G.711.

The SLIC 109 performs analog/digital conversion and telephone line emulation by voice encoding such as G.711. The telephone 110 is a telephone such as a handset or phone-answering machine used for voice communication. The telephone 110 may be arranged inside the FAX apparatus 100, as shown in FIG. 1, or outside it. The SLIC 109 has a function of emulating line connection processing via a telephone line, such as generation of call signals and various tone signals on a telephone line (exchange). With this function, the SLIC 109 can connect the telephone 110 to the IP network 140 without the intervention of a telephone line. When the SLIC 109 receives an off-hook signal and selection signal from the telephone 110, it notifies the CPU 101 that the SLIC 109 has received these signals.

The LAN I/F 111 functions as an interface for the IP network 140, and controls communication with an external apparatus, such as the FAX apparatus 200, connected to the FAX apparatus 100 via the IP network 140. The image processor 112 outputs higher-resolution image data by performing correction processing on image data obtained by reading by the sheet scanner 113 or book scanner 114. Each of the sheet scanner 113 and book scanner 114 includes a CIS (constant image sensor) and original conveyance mechanism, optically reads the image of an original, converts it into electrical image data, and outputs the image data. Note that both of these scanners can read a double-sided original.

The operation unit 115 includes an input device such as a keyboard or touch panel, and a display device (display unit) which displays various kinds of information. The operation unit 115 functions as a user I/F for an operator (user). The line buffer 116 is used to buffer data of one line when performing transfer control of image data. The print buffer 117 is used to buffer data of one page in image data to be printed when printing by the printer 118. The printer 118 prints, on a sheet such as plain paper, an image such as a received image by FAX communication. The printer 118 is also capable of double-sided printing.

<FAX Communication Processing Between FAX Apparatuses>

Figure 2:
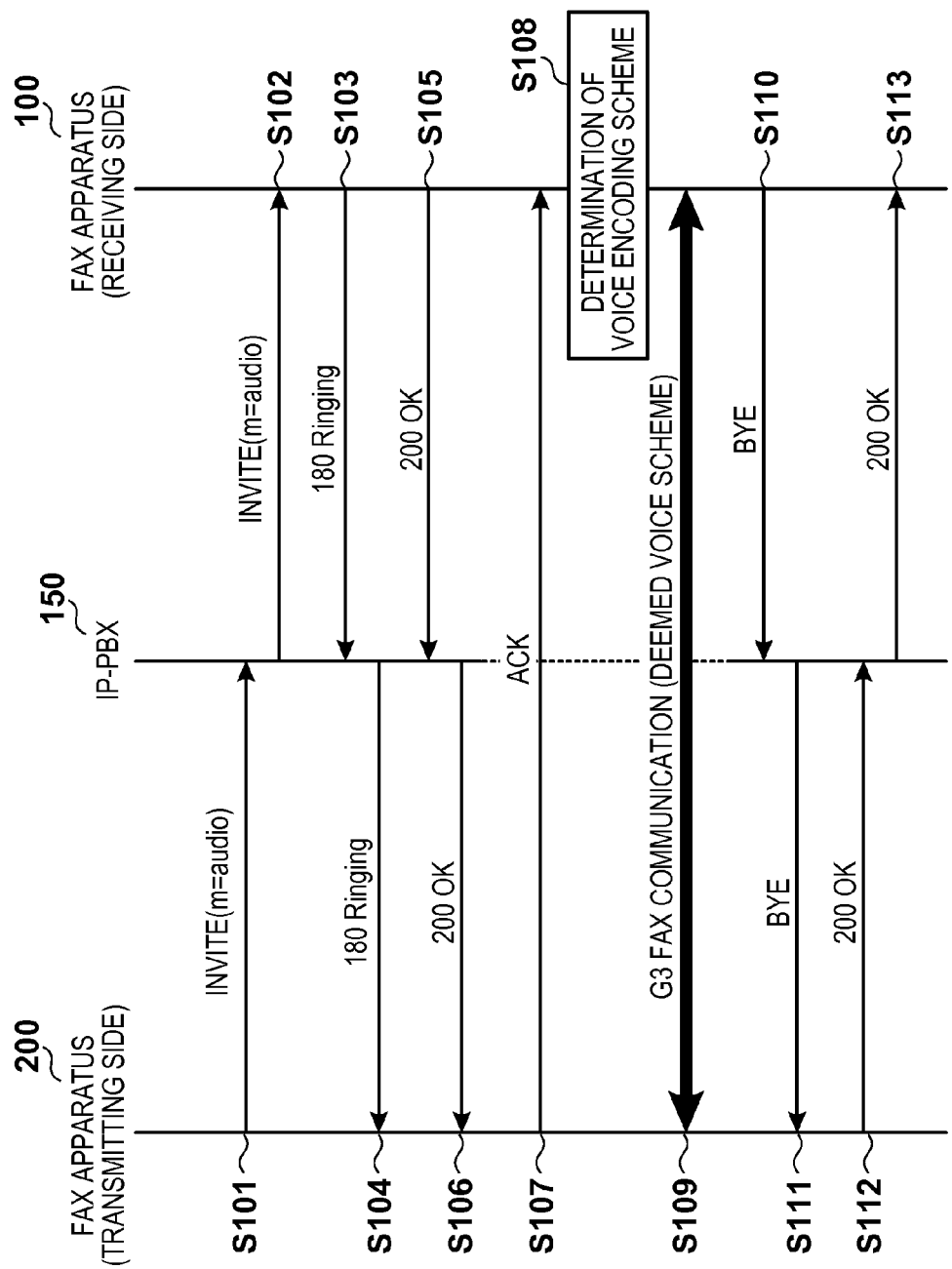
FIG. 2 is a sequence chart showing FAX communication processing in the FAX apparatus according to the embodiments of the present invention.

Next, the procedures of FAX communication processing to be executed between the FAX apparatuses 100 and 200 according to the embodiments of the present invention will be explained with reference to FIG. 2. FIG. 2 shows a case in which FAX transmission is performed from the FAX apparatus 200 to the FAX apparatus 100 via the IP network 140. Processing procedures when the FAX apparatus 200 on the transmitting side and the FAX apparatus 100 on the receiving side establish a SIP session and perform FAX communication by the deemed voice scheme using the established session will be explained.

First, in steps S101 to S107, the FAX apparatuses 100 and 200 establish a voice signal transmission session between the partner apparatuses in FAX communication. More specifically, in step S101, the FAX apparatus 200 on the transmitting side transmits a SIP session establishment request (INVITE message) via the IP-PBX 150 to the FAX apparatus 100 serving as a partner apparatus in the FAX transmission via the IP network 140. When performing FAX communication by the deemed voice scheme, the FAX apparatus 200 transmits, to the FAX apparatus 100 on the receiving side, a session establishment request in which "audio" is designated as a medium type m. The FAX apparatus 200 designates, as a medium attribute in the INVITE message, a voice encoding scheme for voice communication which is used in the established session to encode a FAX signal into a voice signal.

In step S102, the FAX apparatus 100 on the receiving side receives the session establishment request (INVITE message) from the FAX apparatus 200 via the IP-PBX 150. In response to the reception of the session establishment request, in step S103, the FAX apparatus 100 transmits, to the FAX apparatus 200 via the IP-PBX 150, a provisional response (180 Ringing) representing calling (that is, during processing of the session establishment request). In step S104, the FAX apparatus 200 receives the provisional response (180 Ringing) via the IP-PBX 150, and recognizes that the FAX apparatus 100 is calling.

In step S105, the FAX apparatus 100 transmits, via the IP-PBX 150, a successful response (200 OK) representing that calling has succeeded (that is, FAX transmission can be received). By this response, the FAX apparatus 100 notifies the FAX apparatus 200 that FAX transmission can be received. In step S106, the FAX apparatus 200 receives the successful response (200 OK) via the IP-PBX 150. In response to the reception of the successful response (200 OK), the FAX apparatus 200 transmits an acknowledgement (ACK) to the FAX apparatus 100 in step S107. As a result, a voice communication session is established between the FAX apparatuses 200 and 100. In this manner, the FAX apparatus 100 establishes a session with the partner apparatus (FAX apparatus 200) in accordance with an INVITE message received from the partner apparatus. In step S108, the FAX apparatus 100 determines a voice encoding scheme which is used in the established session to encode a FAX signal into a voice signal. More specifically, the FAX apparatus 100 can execute this determination by determining a voice encoding scheme designated in the INVITE message by the FAX apparatus 200.

After that, in step S109, the FAX apparatuses 100 and 200 perform FAX communication by the deemed voice scheme in the established session. At this time, the FAX apparatus 100 limits, in accordance with the determined voice encoding scheme, modulation schemes which are used in the digital modem 108 and are usable in generation of a FAX signal. Note that the FAX apparatus 100 may notify the FAX apparatus 200 on the transmitting side by a control signal, of modulation schemes selectable after the limitation, thereby allowing FAX apparatus 200 to use an appropriate modulation scheme. However, the FAX apparatus 100 may decide a modulation scheme to be used, independently of a notification from the FAX apparatus 200, in accordance with a voice encoding scheme designated in the INVITE message with respect to the FAX apparatus 200.

More specifically, the FAX apparatus 100 can limit modulation schemes usable in the digital modem 108 for FAX communication in step S109, to modulation schemes corresponding to communication rates equal to or lower than a communication rate defined by the determined voice encoding scheme. For example, when it is determined that the voice encoding scheme is G.726, the FAX apparatus 100 limits usable modulation schemes to V.17 and lower modulation schemes (modulation schemes corresponding to communication rates equal to or lower than the V.17 communication rate). In step S109, the FAX apparatuses 100 and 200 select a modulation scheme to be used in generation of a FAX signal from modulation schemes limited as usable modulation scheme among a plurality of selectable modulation schemes corresponding to different communication rates. By using the selected modulation scheme, the FAX apparatuses 100 and 200 perform FAX communication by the deemed voice scheme in the established session.

After the end of transmitting a G3 FAX signal by the deemed voice scheme from the FAX apparatus 200 to the FAX apparatus 100, the FAX apparatus 100 transmits a disconnection request (BYE) to the FAX apparatus 200 via the IP-PBX 150 in step S110. In response to this, the FAX apparatus 100 notifies the FAX apparatus 200 that reception of FAX transmission by the deemed voice scheme has ended. The FAX apparatus 200 receives the disconnection request (BYE) in step S111, and transmits a successful response (200 OK) to the FAX apparatus 100 via the IP-PBX 150 in step S112. In step S113, upon receiving the successful response (200 OK), the FAX apparatus 100 ends the established session.

As described above, according to the embodiments of the present invention, in order to achieve FAX communication by the deemed voice scheme, the FAX apparatus 100 establishes a voice signal transmission session with the FAX apparatus 200 serving as a partner apparatus in FAX communication. The FAX apparatus 100 determines a voice encoding scheme which is used in the established session to encode a FAX signal into a voice signal. In accordance with the determination result, the FAX apparatus 100 limits modulation schemes usable in generation of a FAX signal when performing FAX communication by the deemed voice scheme. For example, the FAX apparatus 100 can limit usable modulation schemes to modulation schemes corresponding to communication rates equal to or lower than a communication rate defined by the voice encoding scheme used in the established session.

By limiting modulation schemes (that is, communication rates in FAX communication) in accordance with a voice encoding scheme to be used, generation of a communication error depending on the compression ratio of the voice encoding scheme can be prevented. In other words, generation of a communication error can be prevented regardless of the voice encoding scheme used to encode a FAX signal. In addition, a modulation scheme for FAX communication can be selected in accordance with the voice encoding scheme to be used so that no communication error is generated. Accordingly, while preventing generation of a communication error, the modulation scheme (that is, the communication rate of FAX communication) can be controlled more appropriately.

Figure 3:
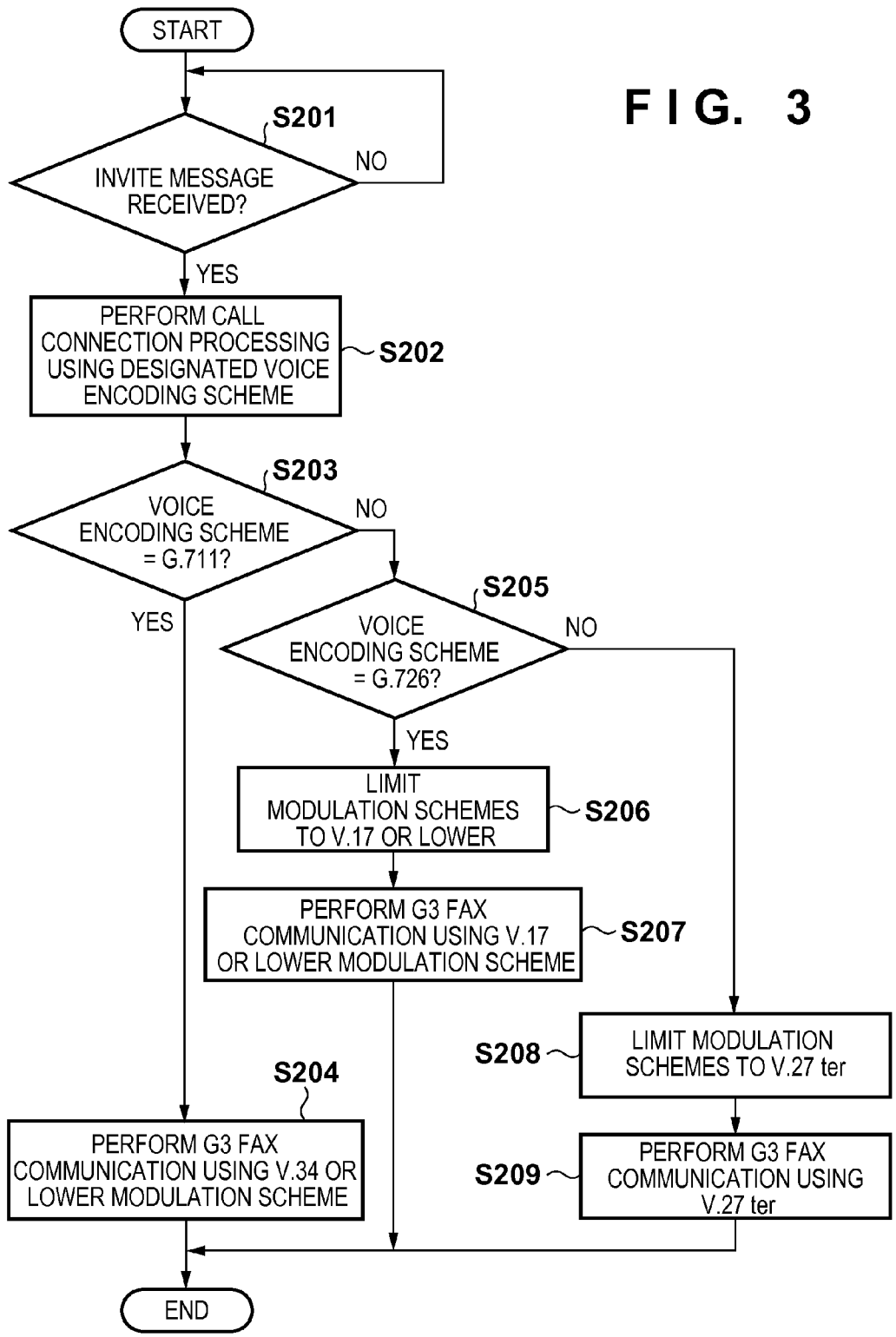
FIG. 3 is a flowchart showing the procedures of FAX communication processing in a FAX apparatus according to the first embodiment.
Figure 4:
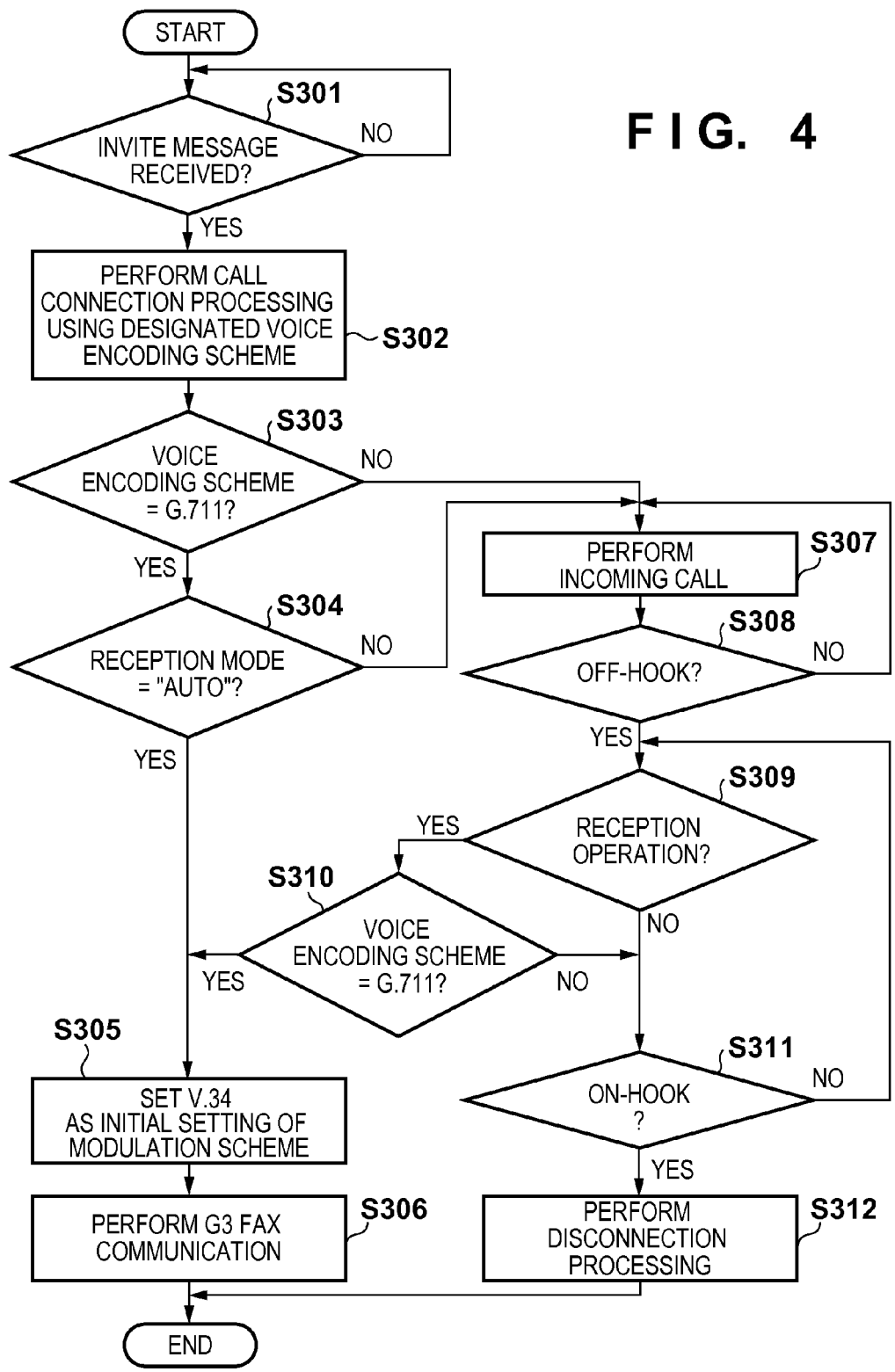
FIG. 4 is a flowchart showing the procedures of FAX communication processing in a FAX apparatus according to the second embodiment.

As examples of limiting modulation schemes usable in the digital modem 108 in accordance with the result of determination in step S108 of FIG. 2, the first and second embodiments will be explained with reference to FIGS. 3 and 4.

First Embodiment

The first embodiment will describe an example in which modulation schemes usable in G3 FAX communication by the deemed voice scheme between FAX apparatuses 100 and 200 are limited to modulation schemes corresponding to communication rates equal to or lower than a communication rate defined by a voice encoding scheme to be used in an established session. FIG. 3 is a flowchart showing the procedures of FAX communication processing to be executed in the FAX apparatus 100 according to the first embodiment. Processing to be executed by the FAX apparatus 100 when performing FAX transmission from the FAX apparatus 200 to the FAX apparatus 100 will be explained. Note that processing of each step shown in FIG. 3 is implemented in the FAX apparatus 100 when a CPU 101 reads out, to a RAM 103, a program stored in a ROM 102, and executes it.

First, in step S201, the CPU 101 determines whether or not it has received a session establishment request (INVITE message) from the FAX apparatus 200 via an IP network 140. If the CPU 101 determines that it has received the INVITE message ("YES" in step S201), it advances the process to step S202, and performs call connection processing for a call connection to the FAX apparatus 200 by using a voice encoding scheme designated by the medium attribute of the INVITE message. As a result, a VoIP voice communication session is established between the FAX apparatus 200 on the transmitting side and the FAX apparatus 100 on the receiving side.

Then, in steps S203 and S205, the CPU 101 of the FAX apparatus 100 determines, based on designation in the INVITE message, a voice encoding scheme to be used in the session established with the FAX apparatus 200. More specifically, in step S203, the CPU 101 determines whether or not the voice encoding scheme to be used in the established session is G.711. If the voice encoding scheme is G.711 ("YES" in step S203), the CPU 101 advances the process to step S204.

If the voice encoding scheme is G.711 (PCM), the CPU 101 need not limit modulation schemes usable in a digital modem 108. This is because the maximum communication rate of G3 FAX is 33.6 kbps in the use of a V.34 modem, and is lower than a communication rate of 64 kbps defined by G.711. Thus, in step S204, the CPU 101 performs G3 FAX communication with the FAX apparatus 200 by using the V.34 or lower modulation scheme in the digital modem 108 without limiting modulation schemes.

In step S204 (and steps S207 and S209 to be described later), the CPU 101 notifies the FAX apparatus 200 via the IP network 140 of information about the limitation of usable modulation schemes. Based on the notified information, the FAX apparatus 200 decides a modulation scheme to be used in the digital modem 108, and performs FAX transmission to the FAX apparatus 100.

If the voice encoding scheme to be used in the established session is one other than G.711 ("NO" in step S203), the CPU 101 limits modulation schemes usable in the digital modem 108 in steps S205 to S209. More specifically, in step S205, the CPU 101 determines whether or not the voice encoding scheme to be used in the established session is G.726. If the voice encoding scheme is G.726 ("YES" in step S205), the CPU 101 advances the process to step S206.

If the voice encoding scheme is G.726 (ADPCM), the CPU 101 limits modulation schemes usable in the digital modem 108 to modulation schemes corresponding to communication rates equal to or lower than a communication rate of 32 kbps defined by G.726. In step S206, the CPU 101 limits modulation schemes usable in the digital modem 108 to modulation schemes corresponding to communication rates equal to or lower than a V.17 communication rate whose maximum communication rate is 14.4 kbps. Further, in step S207, the CPU 101 performs G3 FAX communication with the FAX apparatus 200 by using, in the digital modem 108, modulation schemes corresponding to communication rates equal to lower than the V.17 communication rate.

If the voice encoding scheme is one other than G.711 and G.726 ("NO" in step S205), the CPU 101 advances the process from step S205 to step S208. In step S208, the CPU 101 limits modulation schemes usable in the digital modem 108 to only V.27 ter having a maximum communication rate of 4.8 kbps. Further, in step S209, the CPU 101 performs G3 FAX communication with the FAX apparatus 200 by using V.27 ter in the digital modem 108.

In the first embodiment, modulation schemes usable for FAX communication by the deemed voice scheme in a session established between the FAX apparatuses 100 and 200 are limited in accordance with a voice encoding scheme (G.711, G.726, or another scheme) to be used in this session. Especially when the voice encoding scheme is G.711, modulation schemes are not limited. Hence, the communication rate of FAX communication by the deemed voice scheme can be controlled without unnecessarily limiting modulation schemes (that is, communication rates in FAX communication). Meanwhile, when the voice encoding scheme is one other than G.711, the communication rate of FAX communication by the deemed voice scheme can be controlled while preventing generation of a communication error.

Second Embodiment

The second embodiment will describe an example in which execution of G3 FAX communication is inhibited in a case where a voice encoding scheme to be used in an established session between FAX apparatuses 100 and 200 for G3 FAX communication by the deemed voice scheme does not satisfy a predetermined communication quality in FAX communication. FIG. 4 is a flowchart showing the procedures of FAX communication processing to be executed in the FAX apparatus 100 according to the second embodiment. Processing to be executed by the FAX apparatus 100 when performing FAX transmission from the FAX apparatus 200 to the FAX apparatus 100 will be explained. Note that processing of each step shown in FIG. 4 is implemented in the FAX apparatus 100 when a CPU 101 reads out, to a RAM 103, a program stored in a ROM 102, and executes it.

First, steps S301 to S303 are the same as steps S201 to S203 in the first embodiment. In step S303, the CPU 101 determines whether or not the voice encoding scheme to be used in the established session is G.711. If the voice encoding scheme is G.711 ("YES" in step S303), the CPU 101 advances the process to step S304. If the voice encoding scheme is one other than G.711 ("NO" in step S303), the CPU 101 advances the process to step S307.

The second embodiment assumes only G.711 as a voice encoding scheme which satisfies a predetermined communication quality in G3 FAX communication by the deemed voice scheme. Also, the second embodiment assumes that voice encoding schemes other than G.711 do not satisfy the predetermined communication quality in G3 FAX communication by the deemed voice scheme. If a voice encoding scheme not satisfying the predetermined communication quality, other than G.711, is used, the CPU 101 inhibits execution of G3 FAX communication in steps S307 to S312.

If the CPU 101 advances the process from step S303 to step S304, it determines whether or not the reception mode of the FAX apparatus 100 is an "auto" mode in which a FAX reception operation by the deemed voice scheme is automatically performed. If the reception mode is the "auto" mode ("YES" in step S304), the CPU 101 advances the process to step S305. The CPU 101 sets V.34 as the initial value of a modulation scheme to be used in a digital modem 108 in step S305, and performs G3 FAX communication with the FAX apparatus 200 in step S306. If the reception mode is a "manual" mode in which the FAX reception operation by the deemed voice scheme is not automatically performed ("NO" in step S304), the CPU 101 advances the process to step S307.

In step S307, the CPU 101 executes incoming call processing by causing a telephone 110 to ring by a SLIC 109, and prompts the user to respond. The CPU 101 continues the incoming call processing by the SLIC 109 in step S307 unless the user performs an off-hook operation on the telephone 110 in response to the incoming call ("NO" in step S308). If the off-hook operation is performed on the telephone 110 in step S308 ("YES" in step S308), the FAX apparatus 100 changes to a voice communication state with the partner apparatus (FAX apparatus 200) via an IP network 140. Meanwhile, the CPU 101 monitors a reception operation (step S309), and monitors an on-hook operation on the telephone 110 that represents the end of voice communication (step S311).

In step S309, the CPU 101 determines whether or not the user has performed the reception operation. If the user has performed the reception operation ("YES" in step S309), the CPU 101 determines in step S310 whether or not voice encoding scheme to be used in the established session is G.711. If the voice encoding scheme is G.711 ("YES" in step S310), the CPU 101 sets V.34 as the initial value of a modulation scheme to be used in the digital modem 108 (step S305), and performs G3 FAX communication with the FAX apparatus 200 (step S306). If the voice encoding scheme is one other than G.711 ("NO" in step S310), the CPU 101 advances the process to step S311.

In step S311, the CPU 101 determines whether or not the user has performed the on-hook operation on the telephone 110. If no on-hook operation has been performed ("NO" in step S311), the CPU 101 returns the process to step S309. If the on-hook operation has been performed ("YES" in step S311), the CPU 101 returns the process to step S312. Accordingly, the CPU 101 inhibits execution of G3 FAX communication in the session established with the FAX apparatus 200. Thereafter, in step S312, the CPU 101 disconnects the session established with the FAX apparatus 200.

As described above, according to the second embodiment, in a case where there is a possibility that a communication error is generated in accordance with a voice encoding scheme (G.711 or another scheme) to be used in a session established between the FAX apparatuses 100 and 200, execution of FAX communication itself is inhibited. Even this control can prevent generation of a communication error depending on the voice encoding scheme. Note that the above-described first and second embodiments can be properly combined and practiced.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-171704, filed Aug. 21, 2013, which is hereby incorporated by reference herein in its entirety.

What is claimed is:

1. A communication apparatus capable of executing facsimile communication by a deemed voice scheme using a facsimile signal as a voice signal via an IP network, comprising:
   a session establishment unit configured to establish a voice signal transmission session with a partner apparatus in the facsimile communication;
   a determination unit configured to determine a voice encoding scheme which is used in the session established by the session establishment unit to encode the facsimile signal into the voice signal; and
   a limitation unit configured to limit, in accordance with the voice encoding scheme determined by the determination unit, at least one modulation scheme from being used in generation of the facsimile signal when performing the facsimile communication by the deemed voice scheme in the session established by the session establishment unit.

2. The communication apparatus according to claim 1, wherein the limitation unit limits a modulation scheme corresponding to a communication rate not higher than a communication rate defined by the voice encoding scheme determined by the determination unit from being used.

3. The communication apparatus according to claim 1, wherein
   in a case where the voice encoding scheme determined by the determination unit is G.711, the limitation unit does not limit the at least one modulation scheme from being used, and
   in a case where the voice encoding scheme is a voice encoding scheme other than G.711, the limitation unit limits the at least one modulation scheme from being used.

4. The communication apparatus according to claim 3, wherein
   in a case where the voice encoding scheme is G.726, the limitation unit limits a modulation scheme corresponding to a communication rate not higher than a V.17 communication rate from being used, and
   in a case where the voice encoding scheme is a voice encoding scheme other than G.711 and G.726, the limitation unit limits modulation schemes which is different from V.27 ter from being used.

5. The communication apparatus according to claim 1, wherein in a case where the voice encoding scheme determined by the determination unit is a voice encoding scheme which does not satisfy a predetermined communication quality in the facsimile communication, the limitation unit inhibits execution of the facsimile communication in the session established by the session establishment unit.

6. The communication apparatus according to claim 5, wherein in a case where the voice encoding scheme determined by the determination unit is a voice encoding scheme other than G.711, the limitation unit inhibits execution of the facsimile communication in the session established by the session establishment unit.

7. The communication apparatus according to claim 5, further comprising a disconnection unit configured to disconnect the session established by the session establishment unit in a case where the limitation unit inhibits execution of the facsimile communication.

8. The communication apparatus according to claim 1, wherein
the session establishment unit establishes the session in accordance with a session establishment request received from the partner apparatus, and
the determination unit determines a voice encoding scheme designated in the session establishment request by the partner apparatus.

9. The communication apparatus according to claim 1, further comprising:
a selection unit configured to select a modulation scheme to be used in generation of the facsimile signal from modulation schemes which is not limited by the limitation unit among a plurality of modulation schemes which correspond to different communication rates and are selectable for generation of the facsimile signal; and
a communication unit configured to perform the facsimile communication by the deemed voice scheme in the session established by the session establishment unit by using the modulation scheme selected by the selection unit.

10. A method of controlling a communication apparatus capable of executing facsimile communication by a deemed voice scheme using a facsimile signal as a voice signal via an IP network, comprising steps of:
establishing a voice signal transmission session with a partner apparatus in the facsimile communication;
determining a voice encoding scheme which is used in the session established in the establishing step to encode the facsimile signal into the voice signal; and
limiting, in accordance with the voice encoding scheme determined in the determining step, at least one modulation scheme from being used in generation of the facsimile signal when performing the facsimile communication by the deemed voice scheme in the session established in the establishing step.

11. A non-transitory computer-readable storage medium storing a computer program for causing a computer to execute steps of a method of controlling a communication apparatus capable of executing facsimile communication by a deemed voice scheme using a facsimile signal as a voice signal via an IP network, comprising steps of:
establishing a voice signal transmission session with a partner apparatus in the facsimile communication;
determining a voice encoding scheme which is used in the session established in the establishing step to encode the facsimile signal into the voice signal; and
limiting, in accordance with the voice encoding scheme determined in the determining step, at least one modulation scheme from being used in generation of the facsimile signal when performing the facsimile communication by the deemed voice scheme in the session established in the establishing step.

* * * * *